(12) United States Patent
Frankholz

(10) Patent No.: US 6,648,234 B2
(45) Date of Patent: Nov. 18, 2003

(54) CONTROL KNOB FOR THERMOSTATICALLY REGULATED MIXING VALVE

(75) Inventor: Christian Frankholz, Fröndenberg (DE)

(73) Assignee: Friedrich Grohe AG & Co. KG, Hemer (DE)

( * ) Notice: Subject to any disclaimer, the term of this patent is extended or adjusted under 35 U.S.C. 154(b) by 0 days.

(21) Appl. No.: 10/278,647

(22) Filed: Oct. 23, 2002

(65) Prior Publication Data
US 2003/0085290 A1 May 8, 2003

(30) Foreign Application Priority Data
Nov. 6, 2001 (DE) .......................... 101 53 988

(51) Int. Cl.⁷ .................... G05D 23/13; G05D 23/12
(52) U.S. Cl. ................. 236/12.16; 236/99 K; 236/42
(58) Field of Search .................. 236/12.1, 12.16, 236/42, 43, 99 K

(56) References Cited

U.S. PATENT DOCUMENTS

| | | | | |
|---|---|---|---|---|
| 4,029,256 A | * | 6/1977 | Dauga | 236/12.2 |
| 4,508,262 A | * | 4/1985 | Pedersen et al. | 236/42 |
| 5,205,483 A | * | 4/1993 | Kostorz | 236/12.2 |
| 5,230,465 A | * | 7/1993 | Kostorz et al. | 236/12.1 |
| 5,242,108 A | | 9/1993 | Heimann et al. | 236/12.16 |
| 5,251,811 A | * | 10/1993 | Frankholz | 236/12.16 |

FOREIGN PATENT DOCUMENTS

DE 35 30 812 3/1987

* cited by examiner

Primary Examiner—William E. Tapolcai
(74) Attorney, Agent, or Firm—Herbert Dubno; Andrew Wilford

(57) ABSTRACT

A mixing valve has a housing and a stem axially displaceable to adjust the output temperature of the valve. A tubular core body fixed in the housing an axially displaceable coupling body having an inner end axially engageable with the stem and an outer end formed with a screwthread. Interengaging formations on the coupling body and the core body inhibit rotation of the coupling body in the core body while permitting axial displacement of the coupling body in the core body. A knob rotatable about the axis has a screwthread meshing with the screwthread of the coupling-body outer end. A retainer engaged between the knob and the core body inhibits axial displacement of the knob on the core body and permits rotation of the knob on the core body so that rotation of the knob on the core body axially shifts the coupling body in the core body.

11 Claims, 4 Drawing Sheets

CONTROL KNOB FOR THERMOSTATICALLY REGULATED MIXING VALVE

FIELD OF THE INVENTION

The present invention relates to mixing valve. More particularly this invention concerns a control knob for a thermostatically controlled mixing valve.

BACKGROUND OF THE INVENTION

A standard thermostatically regulated valve such as described in German patent 3,530,812 filed 29 Aug. 1985 by J. Kostorz has hot- and cold-water inlets connected to respective valve seats whose other sides open into an outlet compartment from which tempered water flows. A double valve body is displaceable in one direction to increase the flow from one of the inlets to the outlet compartment and decrease the flow from the other compartments and is oppositely movable for the opposite effect. This valve body can be moved by axially displacing an externally displaceable stem, and is also provided with a temperature-sensitive element in the outlet compartment that can change length to move the valve element and keep it at the setting it is originally put into. Thus once a given mixed-water temperature is set, the temperature-sensitive element will automatically move the valve bodies in response, for instance, to varying supply temperatures to keep the output temperature steady.

Commonly owned U.S. Pat. No. 5,242,108 describes a control assembly for a thermostatically regulated mixing valve having a housing and a stem extending along an axis in the housing and axially displaceable to adjust the thermostatically regulated temperature of the valve. The assembly has a control knob that has a nut threaded on the housing, axially linked to the valve stem, and rotatable about the axis in one direction to move axially inward and move the stem axially inward and in the opposite direction to move axially outward and move the stem axially outward. An inner knob part formed with an angularly extending and axially throughgoing slot is axially coupled to the housing and rotationally coupled to the nut so that the inner knob part rotates with the nut but does not move axially therewith. A stop fixed relative to the housing offset from the axis is angularly engageable with an abutment carried on an outer knob part, projecting through the slot, and displaceable between a normal position angularly engageable with the stop and a displaced position angularly out of alignment with the stop. Formations releasably secure the outer knob part on the inner knob part in any of a plurality of angularly offset positions relative to each other.

Thus with this system the knob does not move axially on the housing as the temperature is adjusted as is desired in modern-day plumbing fittings. The temperature range is normally limited to a maximum temperature which can be overridden easily by pushing the abutment into the displaced position. The maximum normal temperature can easily be changed by decoupling the outer knob part from the inner knob part, changing its angular position somewhat, and then reinstalling it.

OBJECTS OF THE INVENTION

It is therefore an object of the present invention to provide an improved actuating system for a thermostatic mixing valve.

Another object is the provision of such an improved actuating system for a thermostatic mixing valve. which overcomes the above-given disadvantages, that is which is of simpler and more rugged design than the prior-art systems and that has more adjustment capacity.

SUMMARY OF THE INVENTION

A thermostatically regulated mixing valve has a housing and a stem extending along an axis in the housing and axially displaceable to adjust the thermostatically regulated temperature of the valve. According to the invention a tubular core body fixed in the housing and aligned with the stem holds a coupling body axially displaceable in the core body, having an inner end axially engageable with the stem and an outer end formed with a screwthread. Interengaging formations on the coupling body and the core body inhibit rotation of the coupling body in the core body while permitting axial displacement of the coupling body in the core body. A knob rotatable about the axis has a screwthread meshing with the screwthread of the coupling-body outer end. A retainer engaged between the knob and the core body inhibits axial displacement of the knob on the core body and permits rotation of the knob on the core body so that rotation of the knob on the core body axially shifts the coupling body in the core body.

Such construction is extremely rugged, yet simple to manufacture and assemble. It can be counted on to have a long service life.

The coupling body in accordance with the invention has a pair of axially relatively displaceable parts and a spring urging them apart so that the coupling body acts as a force limiter. The knob has a radially outwardly projecting rim and the retainer includes a retaining element having a radially inwardly projecting rim bearing axially on the outwardly projecting rim and retaining it against the coupling body. A slide washer is engaged axially between the rims and the coupling body.

The retaining element according to the invention and the coupling body are formed with complementary axially interengageable arrays of radially projecting and axially extending teeth so that the retaining element can be fitted in an of a multiplicity of angularly offset positions on the coupling body. This provides a wide range of adjustability. The retainer includes a clip engaged transversely of the axis between the retaining element and the coupling body.

The coupling formations include a polygonal-section part on the coupling body and a complementary polygonal-section bore in the core body in which the coupling body is axially shiftable but nonrotatable. In addition the coupling body has a cylindrical inner surface and the core body has a cylindrical outer surface fitting snugly in the coupling body inner surface. This ensures solid mounting of the knob so it turns smoothly. Furthermore according to the invention at least one slide/friction ring is provided between the surfaces. Thus the vibration of normal use will not be enough for the knob to shift position.

The knob according to the invention has an inner lining part fitted to the coupling body and having an array of radially outwardly projecting and axially extending teeth, an outer decorative part having an array of radially inwardly projecting and axially extending teeth fitting with the inner-part teeth, and a screw for fixing the knob parts releasably together.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
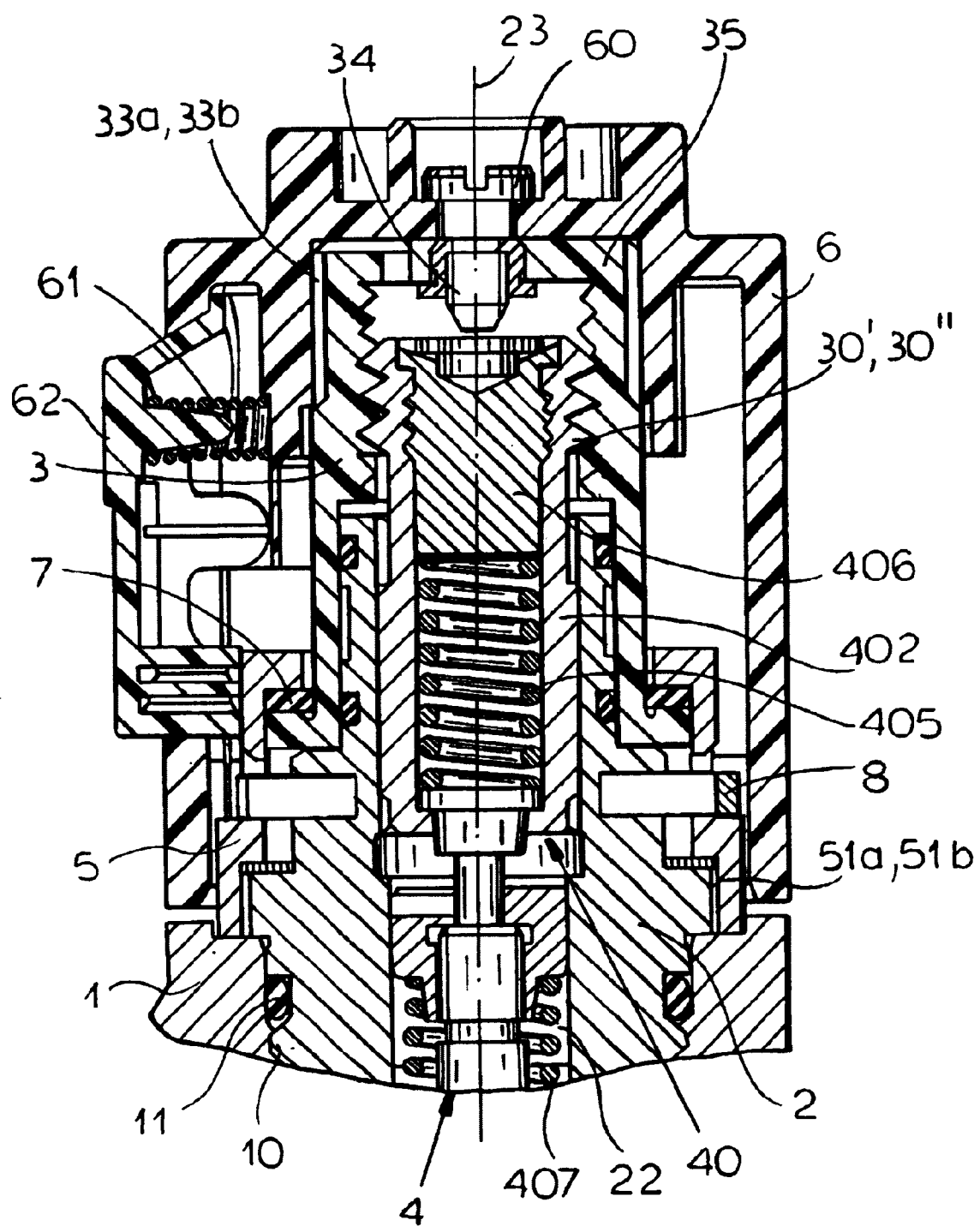
FIG. 1 is an axial section through the valve control assembly according to the invention.
Figure 2:
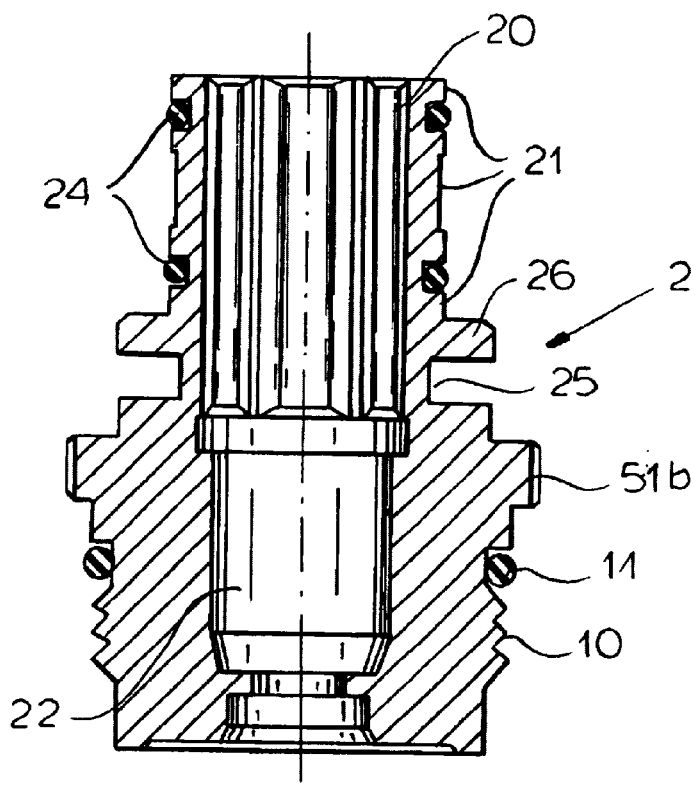
FIG. 2 is an axial section through the core body of the assembly.
Figure 3:
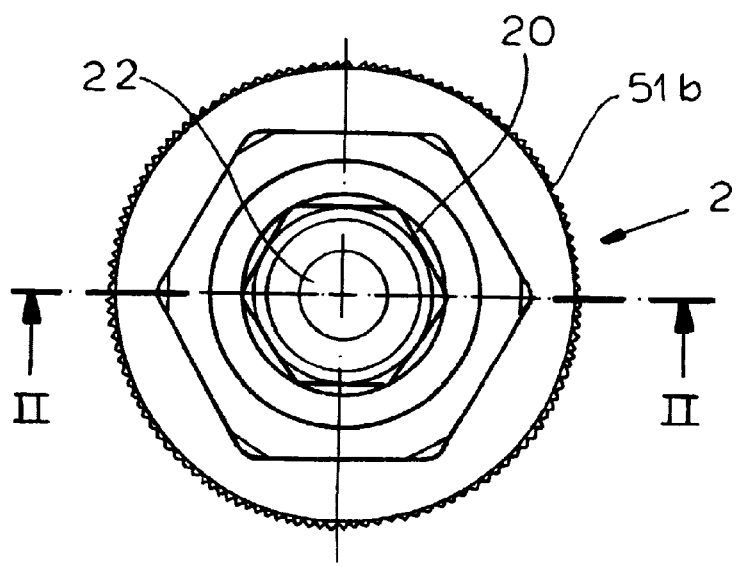
FIG. 3 is a top view of the structure of FIG. 2, line II—II showing the section plane for FIG. 2.

As seen in FIG. 1 through 3 a thermostatically regulated valve such as described in above-cited German patent 3,530,812 has a housing 1 in which a valve stem 4 is displaceable along an axis 23 to adjust mixed-water temperature. A control assembly has a stepped tubular core body 2 secured by a screwthread 10 in the housing 1 and sealed thereagainst by an O-ring 11. This body 2 is formed on the axis 23 with a cylindrical inner bore 22 into which the stem 4 extends, and a polygonal-section outer bore 20.

Figure 5:
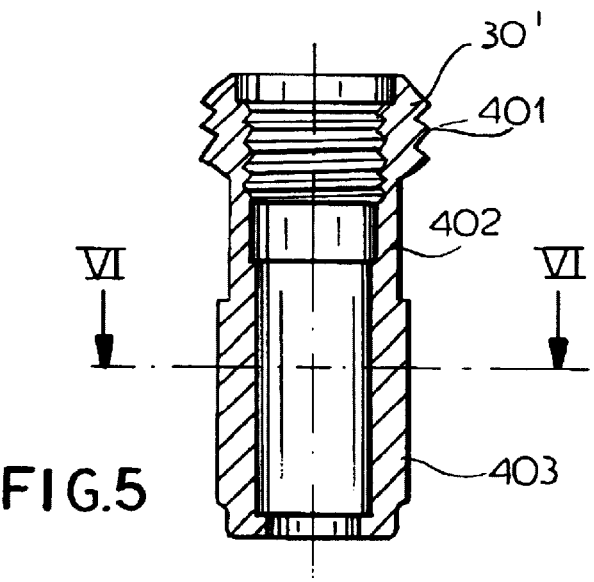
FIG. 5 is an axial section through the stem sleeve.
Figure 6:
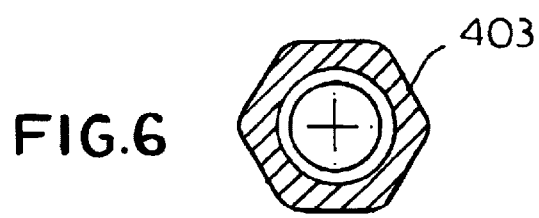
FIG. 6 is a section taken along line VI—VI of FIG. 5.

A force limiter or coupling body 40 has a metallic sleeve or tube 402 (FIGS. 5 and 6) with a hexagonal-section inner part 403 axially slidable in the outer bore 20 and an outer end 401 formed with a screwthread 30'. A plug 406 screwed into the outer end 401 bears by a strong spring 405 on a piston 404 that presses down on the stem 4 which is urged outward by a weaker spring 407. This force limiter 40 prevents the stem 4 from being shifted inward if the unillustrated valve element connected to it gets stuck, preventing damage. The interfit of the hexagonal inner part 403 and the bore 20 rotationally couples the sleeve 402 to the nonrotating core body 2.

Figure 4:
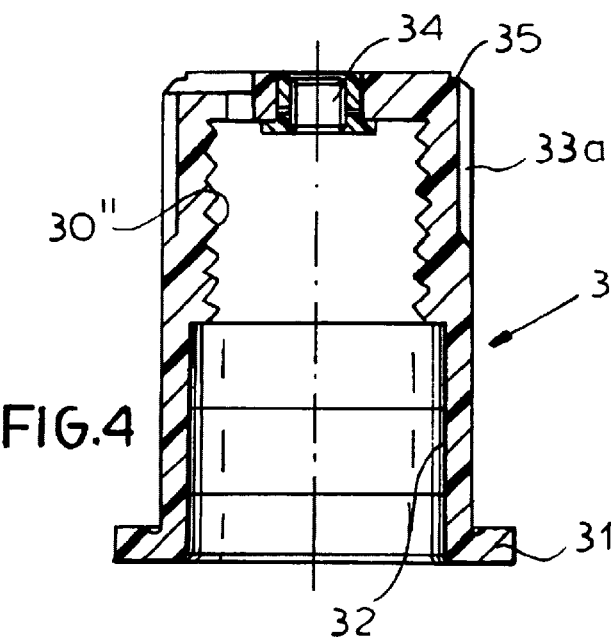
FIG. 4 is an axial section through the knob-liner cap in accordance with the invention.

The external screwthread 30' of the outer sleeve end 401 fits with an internal screwthread 30" of a plastic cup-shaped nut liner 3 shown in detail in FIG. 4. This nut liner 3 has an inner end formed internally with a cylindrical surface 32 adapted to fit snugly over an outer surface 21 of the core body 2, with two axially spaced O-rings 24 ensuring that the liner 3 can rotate smoothly about the axis 23 on the body 2. In addition the liner 3 has an outer end wall 35 fitted centrally with a metallic threaded insert 24 and is also formed at its outer end with an array of axially extending and radially projecting small ridges or teeth 33a. At its inner end it has a radially outwardly projecting lip or rim 31 that sits on a shoulder 26 of the body 2.

Figure 7:
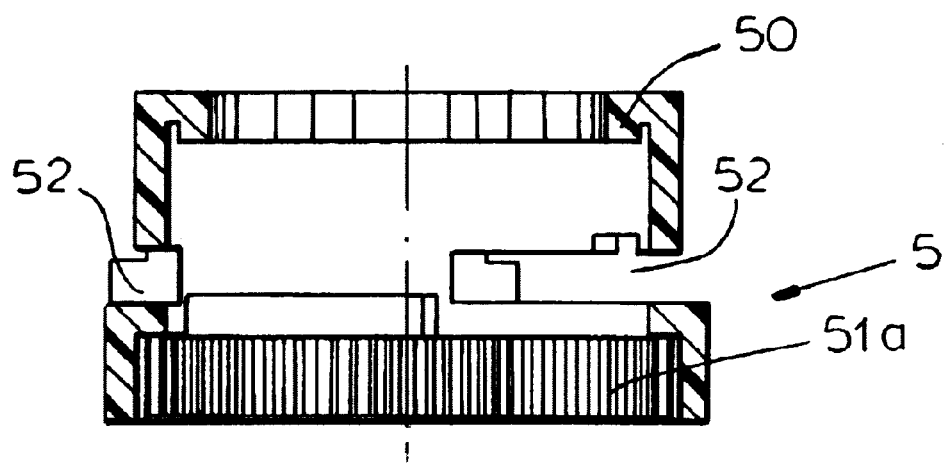
FIG. 7 is an axial section through the retaining element.
Figure 8:
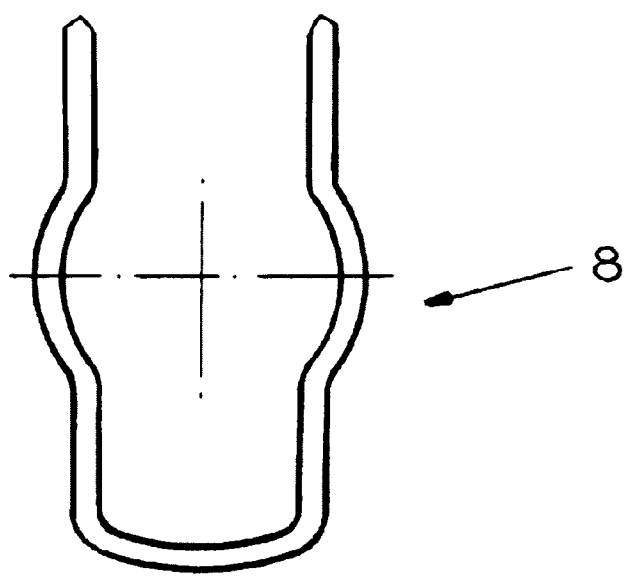
FIG. 8 is a plan view of the retaining clip.

A plastic retaining element 5 (FIG. 7) has an annular array of internal teeth 51a that fit with a complementary array of radially outwardly projecting and axially extending teeth 51b formed on the body 2 so that this element 5 can be fitted at any of a multiplicity of positions with the body 2 and will not rotate when the teeth 51a and 51b are meshed. This element 5 further has at its outer end a radially inwardly projecting lip or rim 50 that engages over the rim 31 of the liner 3 and that bears thereagainst by a slide washer 7 so that the liner 3 can rotate freely about the axis 23 relative to the body 2 but not move axially relative thereto. A slot 52 cut in the retainer cap 5 accommodates a metallic U-shaped clip 8 that fits in a radially outwardly open groove 25 formed in the body 2 to axially lock the retaining cap 5 in place on the body 2. Thus the screwthreads 30' and 30" will cause rotation of the liner 3 to force the sleeve 402 axially inward or outward depending on rotation direction to axially shift the stem 4.

A plastic decorative cup-shaped knob 6 is mounted over the liner 3. It is formed internally with an array of axially extending and radially inwardly projecting teeth 33b that mesh complementarily with the teeth 33a so as to rotationally lock the knob 6 to the liner 3. A screw 60 extending through an end wall of the knob 5 fits in the insert 34 and locks these two parts axially together. An exposed and radially limitedly movable button 32 on the knob 56 is urged outward by a spring 61 and can engage in a radially outwardly open abutment notch formed in the cap 5 to limit the extent of angular displacement of the knob 6 and, with it, of the liner 3 and stem 402.

Thus in this system the knob 6 is axially fixed to the liner 3 which is axially fixed by the cap 5 to the axially nondisplaceable core body 2, but can rotate about the axis 23 relative to this body 2 to the extent allowed by the button/abutment 62. Such rotation screws the sleeve 402 of the limiter 40 in the liner 3 to shift the stem 4 axially, either inward against the force of this spring 407 or outward. The cap 5 can be installed at any of a large multiplicity of angularly offset positions on the body 2 because of the fineness of the complementary teeth 51a and 51b, and similarly the knob 6 can be set at any of a large multiplicity of angularly offset positions on the liner 3 due to the fineness of the complementary teeth 33a and 33b.

The above-described assembly is put together by first screwing the core body 2 into the housing 1. Then the sleeve 402 with the plug 406, spring 405, and piston 404 are fitted down in the core body 2 until he piston 404 contacts the stem 4.

The liner 3 and slide washer 7 are fitted into the retaining element until the flange 31 bears via the washer 7 on the rim 50. The two slide O-rings 24 are set in their grooves on the surface 21 and the subassembly of the liner 3 and retaining element 5 are fitted down over the body 2 until the screwthread 30" engages the screwthread 30". The liner 3 is screwed down into the desired position and the teeth 51a are fitted down into the teeth 51b. The retaining clip 8 is then slipped into the hole 52 to engage in the groove 25 and lock the element 5 to the body 2.

The knob 6 is then fitted in the desired position down over the liner 3 with the teeth 33a and 33b locking them rotationally together. The screw 60 is installed and an unillustrated cap is fitted over this screw 60 to hide it. The assembly is complete.

I claim:

1. In combination with a thermostatically regulated mixing valve having a housing and a stem extending along an axis in the housing and axially displaceable to adjust the thermostatically regulated temperature of the valve:

a tubular core body fixed in the housing and aligned with the stem;

a coupling body axially displaceable in the core body, having an inner end axially engageable with the stem and an outer end formed with a screwthread;

means including interengaging formations on the coupling body and the core body for inhibiting rotation of the coupling body in the core body while permitting axial displacement of the coupling body in the core body;

a knob rotatable about the axis and having a screwthread meshing with the screwthread of the coupling-body outer end;

retaining means engaged between the knob and the core body for inhibiting axial displacement of the knob on the core body and permitting rotation of the knob on the core body, whereby rotation of the knob on the core body axially shifts the coupling body in the core body.

2. The combination defined in claim 1 wherein the coupling body has a pair of axially relatively displaceable parts and a spring urging them apart, whereby the coupling body acts as a force limiter.

3. The combination defined in claim 1 wherein the knob has a radially outwardly projecting rim and the retaining means includes a retaining element having a radially inwardly projecting rim bearing axially on the outwardly projecting rim and retaining it against the coupling body.

4. The combination defined in claim 3, further comprising a slide washer engaged axially between the rims and the coupling body.

5. The combination defined in claim 3 wherein the retaining element and the coupling body are formed with complementary axially interengageable arrays of radially projecting and axially extending teeth, whereby the retaining element can be fitted in an of a multiplicity of angularly offset positions on the coupling body.

6. The combination defined in claim 5 wherein the retaining means includes a clip engaged transversely of the axis between the retaining element and the coupling body.

7. The combination defined in claim 1 wherein the formations include a polygonal-section part on the coupling body and a complementary polygonal-section bore in the core body in which the coupling body is axially shiftable but nonrotatable.

8. The combination defined in claim 1 wherein the coupling body has a cylindrical inner surface and the core body has a cylindrical outer surface fitting snugly in the coupling body inner surface.

9. The combination defined in claim 8, further comprising at least one slide ring between the surfaces.

10. The combination defined in claim 1 wherein the knob has an inner lining part fitted to the coupling body and having an array of radially outwardly projecting and axially extending teeth, an outer decorative part having an array of radially inwardly projecting and axially extending teeth fitting with the inner-part teeth, and means for fixing the knob parts releasably together.

11. The combination defined in claim 10 wherein the fixing means is a screw threaded through the outer knob part into the inner knob part.

* * * * *